United States Patent [19]

Birecki et al.

[11] Patent Number: 5,329,386
[45] Date of Patent: Jul. 12, 1994

[54] FIBER-OPTIC FACEPLATE WITH TILTED FIBERS

[75] Inventor: Henryk Birecki; Laurence M. Hubby, Jr., both of Palo Alto, Calif.

[73] Assignee: Hewlett-Packard Company, Palo Alto, Calif.

[21] Appl. No.: 46,539

[22] Filed: Apr. 13, 1993

[51] Int. Cl.⁵ .................. G02F 1/1335; G02F 1/1333; G02B 6/00
[52] U.S. Cl. ..................................... 359/42; 359/82; 385/901
[58] Field of Search ..................... 359/42, 82; 385/129, 385/130, 901

[56] References Cited

U.S. PATENT DOCUMENTS

| | | | |
|---|---|---|---|
| 4,017,157 | 4/1977 | Van Riet | 359/42 |
| 4,183,630 | 1/1980 | Funada et al. | 359/42 |
| 4,344,668 | 8/1982 | Gunther et al. | 359/42 |
| 4,349,817 | 9/1982 | Hoffman et al. | 359/42 |
| 4,486,760 | 12/1984 | Funada et al. | 359/42 |
| 5,035,490 | 7/1991 | Hubby, Jr. | 350/337 |

FOREIGN PATENT DOCUMENTS

| | | | |
|---|---|---|---|
| 54-66862 | 5/1979 | Japan | 359/42 |
| 2120396 | 11/1983 | United Kingdom | 359/42 |

OTHER PUBLICATIONS

Miyoshi, Katsuya et al.; "Conoscopic Study of Liquid Crystal after Application and Removal of the External Electric Field"; Japanese Journal of Applied Physics, vol. 22, No. 12 (Dec., 1983), pp. 1754–1765.

Primary Examiner—Anita P. Gross

[57] ABSTRACT

Significantly improving in the contrast ratio of a visual image display using a liquid crystal layer and a fiber optic faceplate with tilted fibers. One preferred embodiment of the visual image display includes a liquid crystal layer, a first polarizer and an optical fiber faceplate with many substantially parallel fibers. Each fiber has an axis which forms an oblique angle with the normal to the front surface of the liquid crystal layer. All the oblique angles are substantially equal to a typical oblique angle. The typical oblique angle is selected along the direction that substantially maximizes the contrast ratio of the display.

12 Claims, 7 Drawing Sheets

FIBER-OPTIC FACEPLATE WITH TILTED FIBERS

BACKGROUND OF THE INVENTION

The present invention relates generally to a visual image display and more particularly to a visual image display with a fiber-optic faceplate.

A visual image display with a liquid crystal layer and a fiber-optic faceplate has the advantages of reducing glare, ghost images and parallax. The advantages are due to the fibers in the faceplate controlling the optical paths of light incident to and reflecting from the liquid crystal layer. These features are very important especially in the area of pen computers. A general discussion of such a display can be found in U.S. Pat. No. 5,035,490.

Figure 1:
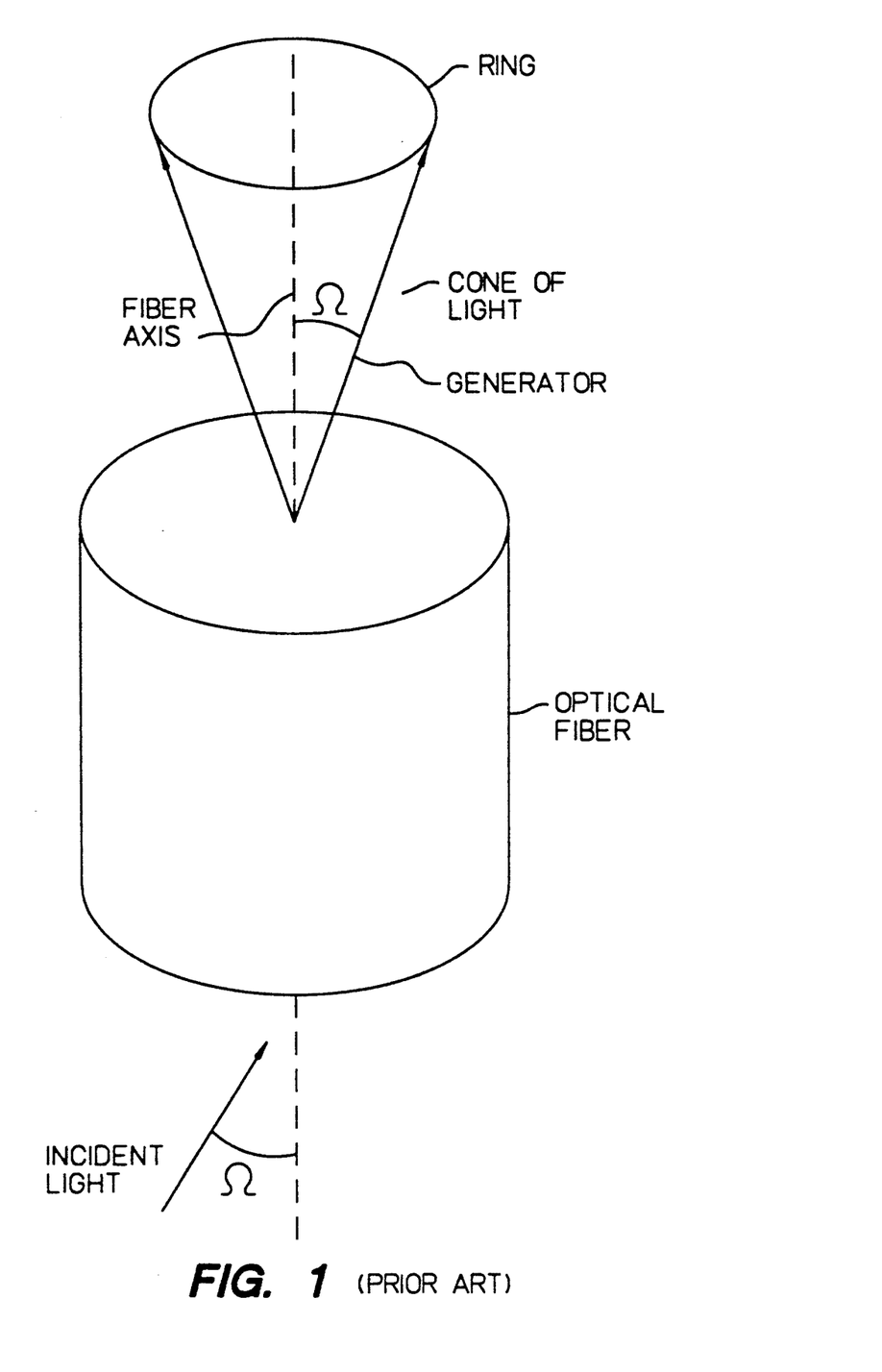
FIG. 1 shows a prior art optical fiber redistributing a ray of incident light into a cone of light.

An optical fiber redistributes incident light. FIG. 1 shows a ray of light incident onto one end of the fiber at an angle $\Omega$. The light propagates through the fiber and emits from the other end as a cone of light. The cone of light has substantially uniform intensity on the directrix or ring of the cone. The angle between the axis of the fiber and the generator of the cone is approximately $\Omega$.

Figure 2:
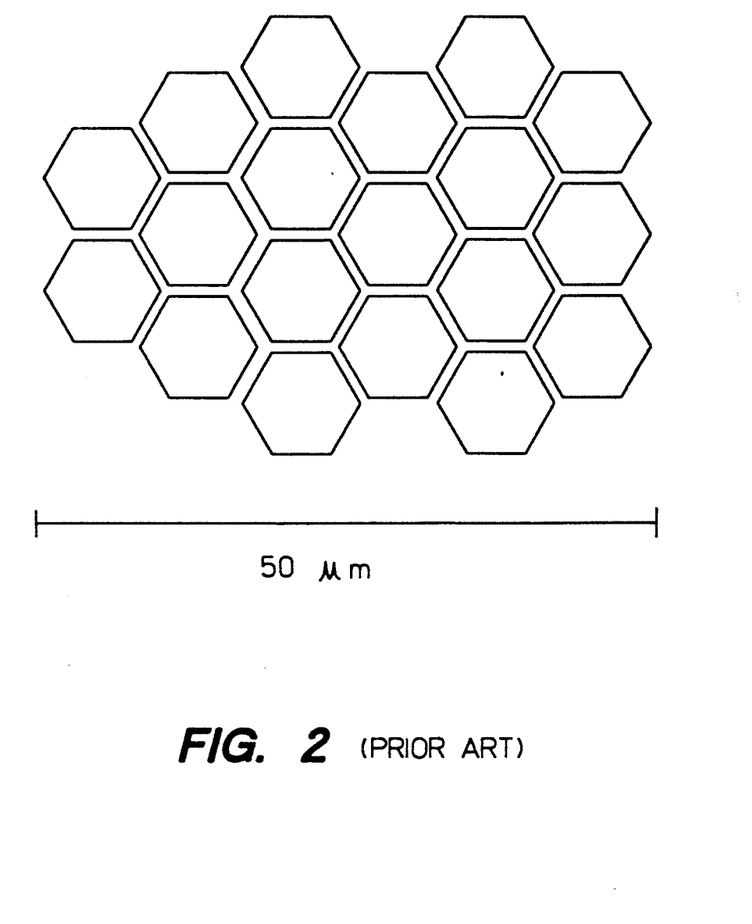
FIG. 2 shows the top view of a prior art optical-fiber faceplate.

A faceplate has numerous fibers bundled together. All the fibers are substantially parallel to each other. FIG. 2 shows the top view of such a faceplate. Every one of those honeycomb shape structures is a fiber.

There are different types of liquid crystal layers. In one type, a liquid crystal layer is sandwiched between polarizers to form a display. A light source is positioned above one surface of the display, and a viewer looks at the display from the opposite surface. When a pre-determined electric field is applied to the liquid crystal layer, the display becomes substantially transparent. This is known as the "bright" state of the liquid crystal layer. With another pre-determined electric field, the display is significantly less transparent. This is known as the "dark" state of the liquid crystal layer. An important term for the liquid crystal layer is its contrast ratio. This ratio is defined as the ratio of the intensity of light transmitted through the layer in its "bright" state to its "dark" state. The larger the contrast ratio, the easier it is to view an image on the display.

Figure 3:
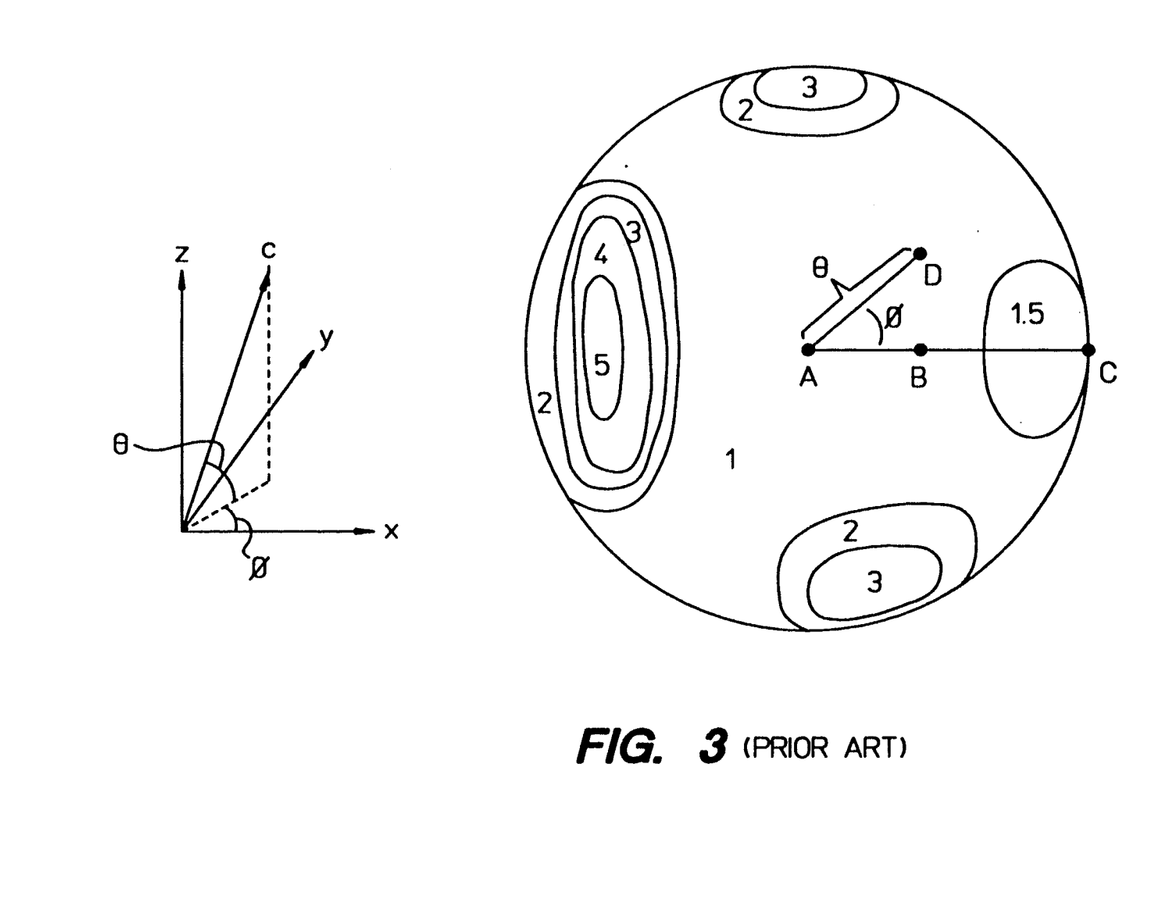
FIG. 3 illustrates a conoscopic pattern of a prior art liquid crystal layer.

In the "dark" state, the liquid crystal layer is not uniformly "dark". The layer appears more transparent along certain directions than along other directions. FIG. 3 shows a polar projection of the degree of darkness from the layer in its "dark" state. It is known as its conoscopic pattern.

The conoscopic pattern shows how dark the liquid crystal layer is as a function of both the azimuthal and the elevational angles from the surface of the layer. For example, the points on the line from A to C denote the degree of darkness along the X axis with an elevation angle ranging from 90° to 0°; point A has an azimuthal angle of 0° and an elevation angle 90°; point B has an azimuthal angle of 0° and an elevation angle 60°; and point C has an azimuthal angle of 0° and elevation angle 0°. Point D in the Figure has an azimuthal angle $\phi$ and an elevation angle $\theta$.

The degree of darkness can be represented by a number, the lower the number, the darker the direction. In other words, if one views the layer along a direction with a higher number, one will see more light; for example, the section with a number 5 is more transparent than that with a number 4. A general discussion on conoscopic patterns of liquid crystal layers can be found in "Conoscopic Study of Liquid Crystal After Application and Removal of the External Electric Field," written by Katsuya Miyoshi et al., and published in the Japanese Journal of Applied Physics Vol. 22, Number 12, Page 1754, 1983.

Figure 4:
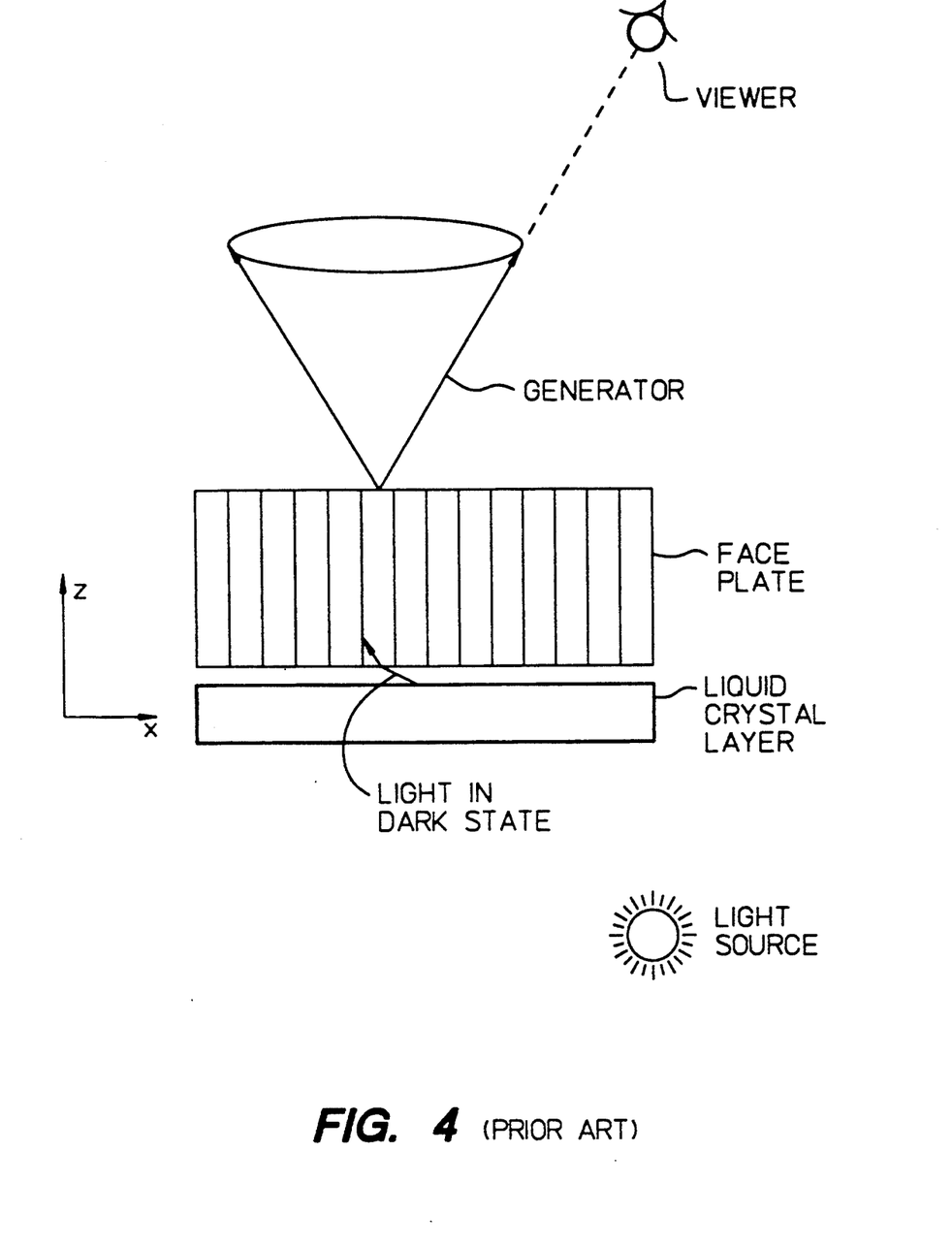
FIG. 4 depicts a part of a prior art visual image display with a faceplate and a liquid crystal layer.

FIG. 4 shows a part of a prior art visual image display with a fiber-optic faceplate located adjacent to a liquid crystal layer. Additional layers, such as polarizers, electrodes and reflectors, are removed from the Figure for clarity. Every fiber in the faceplate is substantially perpendicular to the surface of the layer. The layer has a conoscopic pattern as shown in FIG. 3. FIG. 4 shows light propagating from region 4 in the "dark" state into the fiber. The direction of the light is approximately along an azimuthal direction of about 180° and an elevation angle of about 45°. FIG. 4 shows a fiber in the faceplate redistributing the light into a cone of light. The liquid crystal layer with the conoscopic pattern as shown in FIG. 3 generates numerous cones of light. Such cones of light significantly reduce the contrast ratio of the display.

It will be apparent from the foregoing that there is still a need to improve in the contrast ratio of a visual image display with a liquid crystal layer and a faceplate.

SUMMARY OF THE INVENTION

The present invention significantly improves in the contrast ratio of a visual image display using a liquid crystal layer and an optical fiber faceplate with tilted fibers. The larger the contrast ratio, the easier it is to view an image on the display.

One preferred embodiment of the invented visual image display includes a liquid crystal layer, a first polarizer and an optical fiber faceplate.

The faceplate is located adjacent to the front surface of the first polarizer. The first polarizer is located adjacent to the front surface of the liquid crystal layer.

The liquid crystal layer has a "bright" state and a "dark" state. The optical fiber faceplate has many substantially parallel optical fibers. Each fiber has an axis, which forms an oblique angle with the normal to the liquid crystal layer. The oblique angles of all the fibers are substantially equal to a typical oblique angle.

The display has different contrast ratios along different directions from the front surface of the faceplate. For each direction, the contrast ratio is determined by comparing the amount of light travelling through the display in the "bright" state of the liquid crystal layer to its "dark" state in that direction.

The typical oblique angle is selected along the direction that substantially maximizes the contrast ratio of the display. One way to achieve this is by first determining the refractive index of the faceplate. Then the conoscopic pattern of "dark" state of the liquid crystal layer is measured, and the substantially darkest direction is identified. Finally, the oblique angle is selected to be substantially along the direction that is the darkest direction corrected by the refractive index.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

The present invention significantly improves in the contrast ratio of a visual image display using a liquid crystal layer and a fiber optic faceplate. In the prior art, such a display is not as dark as desired when the liquid crystal layer is in its "dark" state. This is because of the conoscopic pattern of the liquid crystal layer, and the faceplate. The pattern indicates that the liquid crystal layer is not as dark along certain directions, and the faceplate redistributes light from those directions into cones of light. With the "dark" state not as dark, the contrast ratio of the display is reduced. In the present invention, by tilting the fibers in the faceplate along a pre-determined direction, the contrast ratio of the display is significantly improved.

Figure 5:
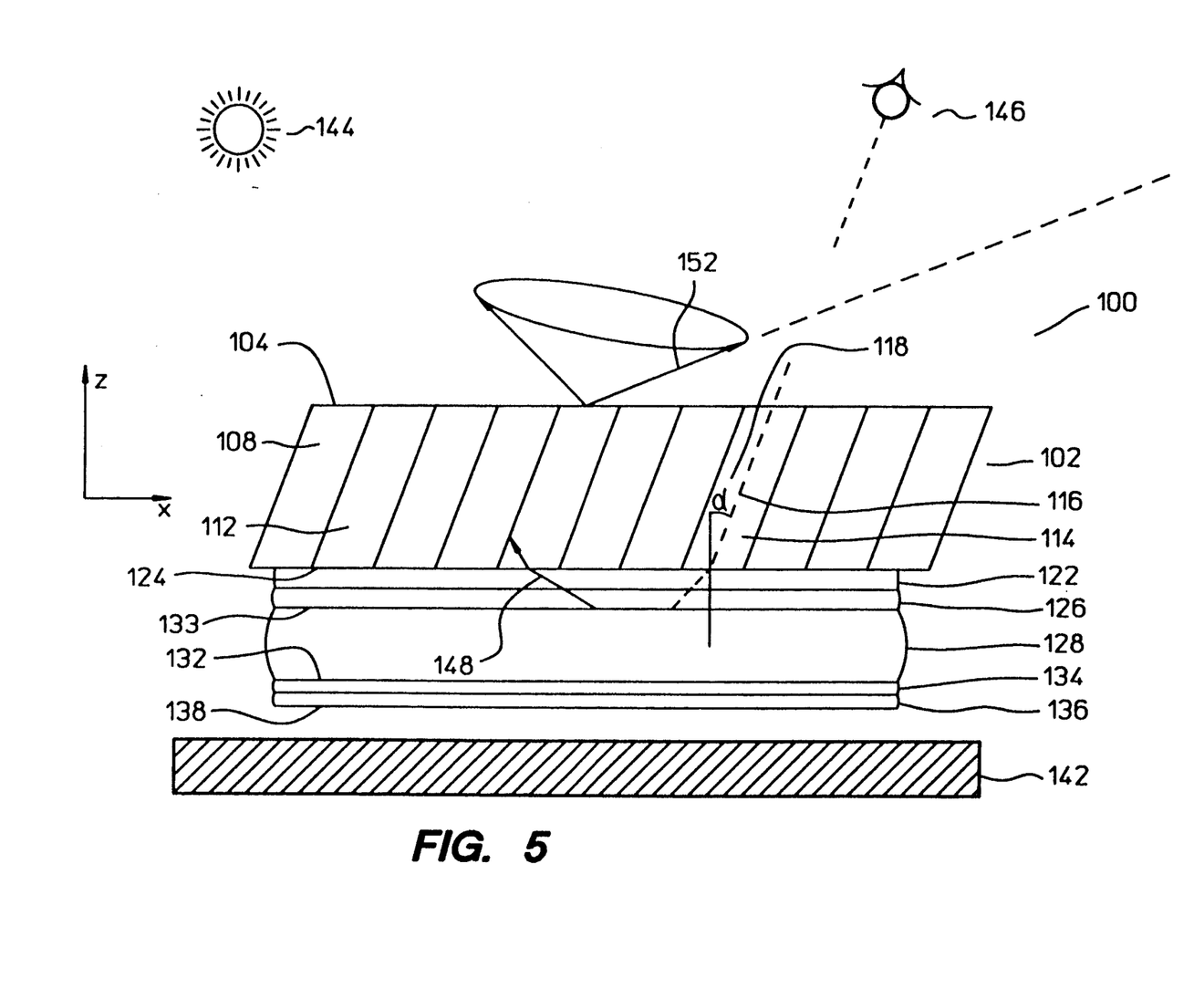
FIG. 5 shows a first preferred embodiment of the invention.

FIG. 5 shows a first preferred embodiment of the invented visual image display 100. It has a liquid crystal layer 128, which has a "bright" state and a "dark" state depending on the electric field applied on it. The crystal layer 128 has a front surface 133 and a back surface 132. Its back surface 132 is located adjacent to a reflector 142.

The front surface 133 of the crystal layer 128 is located adjacent to a polarizer 122, which has a front surface 124. An optical fiber faceplate 102 is located adjacent to the front surface 124 of the polarizer. The faceplate 102 has a front surface 104, and has many optical fibers, such as 108, 112 and 114. The optical fibers are substantially parallel. Each fiber has an axis; for example, the fiber 114 has the axis 116. The angle between the axis of any fiber and the normal to the front surface 133 of the liquid crystal layer 128 is an oblique angle. The oblique angles of all the fibers are substantially equal to a typical oblique angle $\alpha$, 118. The faceplate has a refractive index, and a preferred thickness within the range of 0.7 to 3 millimeters.

The display 100 further comprises a first transparent electrode 126 which is located either between the first polarizer 122 and the liquid crystal layer 128, or between the faceplate 102 and the first polarizer 122. The electrode applies an electric field to the liquid crystal layer 128. If the polarizer 122 is thick, such as approximately more than five microns thick, the electrode is preferably located between the first polarizer 122 and the liquid crystal layer 128. This is because if the first transparent electrode 126 is located between the faceplate 102 and the first polarizer 122, the voltage on the electrode has to increase significantly to bias the liquid crystal layer 128 if the polarizer 122 is thick.

The display 100 may have a second polarizer 136 located in between the liquid crystal layer 128 and the reflector 142. This polarizer 136 is optional.

The display 100 also has a second transparent electrode 134, which is located adjacent to the back surface 132 of the liquid crystal layer 128 to bias the liquid crystal layer 128. If the display has the second polarizer 136, then the second transparent electrode 134 is located either between the liquid crystal layer 128 and the second polarizer 136 or between the second polarizer 136 and the reflector 142. Again the preferred position of the second transparent electrode 134 depends on the thickness of the second polarizer 136. In another preferred embodiment, the reflector 142 also performs the functions of the second transparent electrode.

In operation, the display 100 is illuminated by a light source 144 located above the front surface 104 of the faceplate 102. The faceplate 102 guides the light from the source 144 to the first polarizer 122 and the liquid crystal layer 128. Depending on the voltages of the first and second electrode, the liquid crystal layer 128 is either in its "bright" state or its "dark" state. If the liquid crystal layer 128 is in the "bright" state, light from the source 144 goes through it and is reflected back by the reflector 142 to be viewed by a viewer 146. If the liquid crystal layer 128 is in the "dark" state, depending on the conoscopic pattern of the crystal layer, different intensity of light is transmitted back to the faceplate 102 along different direction. The typical oblique angle, 118, of the fibers in the faceplate 102 is determined by the "bright" and "dark" state or the contrast ratio.

The display 100 has different contrast ratios along different directions from the front surface 104 of the faceplate 102. The contrast ratio along any direction is determined by comparing the amount of light travelling along that direction through the display 100 in the "bright" state of the liquid crystal layer 128 to its "dark" state. Usually the display 100 is oriented to improve in the contrast ratio for the viewer 146.

The typical oblique angle $\alpha$, 118, of the fibers in the faceplate is selected along a direction that substantially maximizes the contrast ratio of the display 100. The typical oblique angle, 118, is determined mostly by the "dark" state because the "bright" state is relatively direction insensitive.

To determine the typical oblique angle, 118, one first generates the conoscopic pattern of the liquid crystal layer 128. To generate the conoscopic pattern, the faceplate 102 is removed from the display 100. Appropriate voltages are applied to the two electrodes to set the liquid crystal layer 128 in its "dark" state. The intensity of light transmitted through the layer is measured along different directions from the front surface 133 of the liquid crystal layer 128. In this example, the conoscopic pattern generated is the one shown in FIG. 3.

The next step in determining the typical oblique angle depends on the objective of the display. If the objective is to generate a display with the highest contrast, then the substantially darkest direction in the pattern is identified. If the objective is to generate a display with the highest contrast ratio across the broadest directions, then the direction to be identified is approximately the center of the largest contiguous area with approximately the lowest degree of darkness. This direction is shown as point B, the approximate center of region 1, the lowest degree of darkness, in FIG. 3. Point B has an azimuthal angle of 0° and an elevational angle of 60°. In this example, point B is selected.

The conoscopic pattern is generated without the faceplate 102, but the display 100 has the faceplate 102. If the refractive index of the faceplate is one, the axes of the fibers should point along point B. Then, when the display 100 is viewed along point B, the display with the tilted fibers substantially maximizes the contract ratio of the display.

However, the refractive index of the faceplate 102 is usually larger than one, which means that the faceplate 102 refracts light. Thus, the axes of the fibers should point along the direction that is point B corrected by the refractive index.

The azimuthal angle of point B is not affected by the refractive index because that angle just indicates the preferred orientation of the fibers azimuthally. In the present case, the fibers should all point substantially along the direction with an azimuthal angle of 0° or the direction along the x-axis.

The elevational angle of the point B is modified by the refractive index. By the law of refraction, the typical oblique angle $\alpha$, 118, for the fibers is determined by the elevational angle of point B as follows:

$$\text{the index of refraction} = \frac{\sin(90° - \text{elevational angle of point } B)}{\sin \alpha}.$$

In one embodiment, the index of refraction is preferably 1.5. This leads to the typical oblique angle $\alpha$, 118, of the fibers to be about 20°. All the fibers are tilted by about 20° from the normal of the liquid crystal layer 128.

The tilted fibers significantly improves in the contrast ratio of the display 100. Light from the regions with a high degree of darkness in the conoscopic pattern is redistributed by the fibers and usually emitted along steep angles. For example, the light ray 148 representing the light from region 5 of the conoscopic pattern in FIG. 3 is redistributed by the fibers. The generator 152 of the cone of light from the light ray 148 misses the viewer 146.

Figure 6:
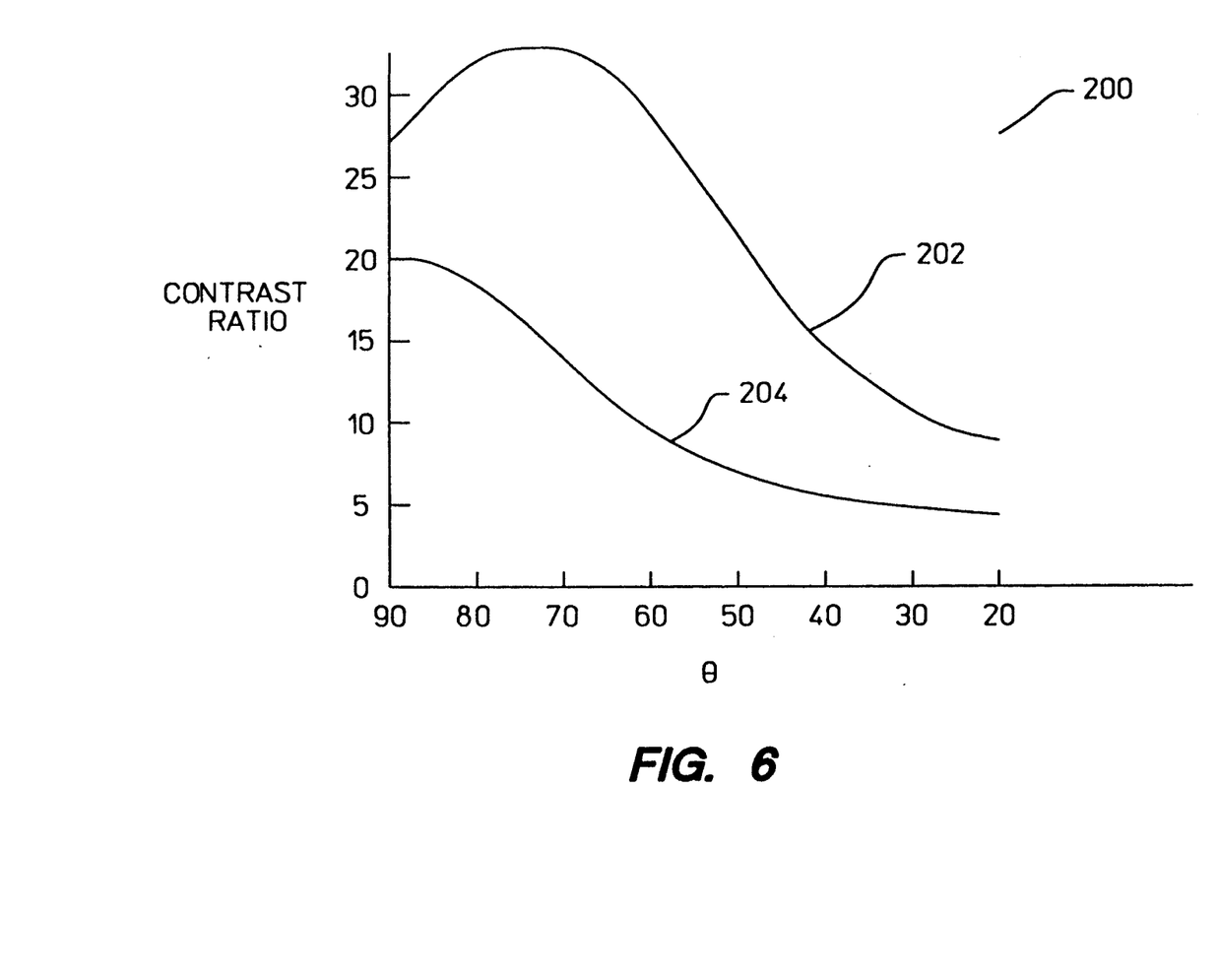
FIG. 6 is a graph showing the differences in contrast ratios of a display with and without tilting the fibers.

FIG. 6 is a graph 200 showing the differences in contrast ratios of the display 100 with and without the fibers tilted. The conoscopic pattern of the liquid crystal layer is as shown in FIG. 3. The curve 202 is calculated for fibers with an azimuthal angle of 0° and an oblique angle of about 20°. The curve 204 is calculated for fibers without tilting, or the fibers whose axes are perpendicular to the liquid crystal layer.

As described above, the contrast ratio of the display is substantially maximized if the display is viewed along the axes of the fibers. With a typical oblique angle of 20°, the elevational angle maximizing the contrast ratio is 70°. At that elevational angle, as shown in FIG. 6, tilting the fibers approximately doubles the contrast ratio. FIG. 6 also indicates that the contrast ratios across all the elevational angles are significantly improved by tilting the fibers.

Figure 7:
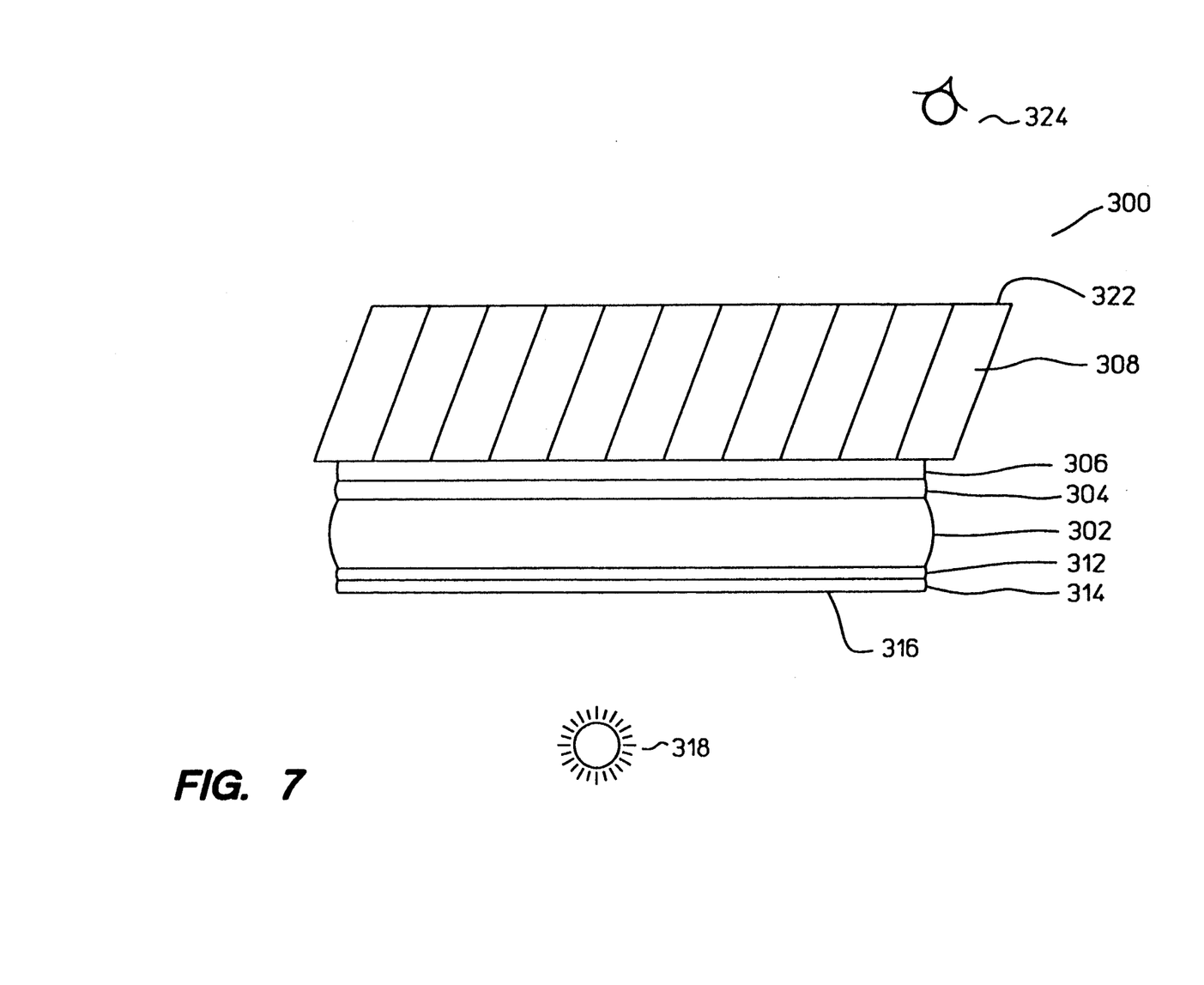
FIG. 7 shows a second preferred embodiment of the invention.

FIG. 7 shows a second preferred embodiment 300 of the invention. It has a liquid crystal layer 302, a first transparent electrode 304, a first polarizer 306, a second transparent electrode 312 and a faceplate with tilted fibers 308 as in the first embodiment. The second embodiment has a second polarizer 314. Again, as in the first embodiment, the electrodes can be located on the other side of their corresponding polarizers depending on the thicknesses of the polarizers.

In operation, a light source 318 illuminates the back surface 316 of the display 300. A viewer 324 looks at the display from the front surface 322 of the faceplate 308. The fibers in the faceplate 308 are again tilted as in the first embodiment to significantly improve in the contrast ratio of the display 300.

The present invention significantly improves in the contrast ratios of a visual image display with a faceplate and a liquid crystal layer by tilting the fibers in the faceplate. The larger the contrast ratio, the easier it is to view an image on the display.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A visual image display comprising:
   a liquid crystal layer having a front surface and a contrast ratio that depends on the viewing direction from the front surface;
   a first polarizer, having a front surface, located adjacent to the front surface of the liquid crystal layer; and
   an optical fiber faceplate having a front surface and a plurality of substantially parallel optical fibers, the faceplate located adjacent to the front surface of the first polarizer, each fiber having an axis which forms an oblique angle with the normal to the front surface of the liquid crystal layer, the oblique angles of all the fibers being substantially equal to a typical oblique angle;
   wherein:
   the typical oblique angle is selected according to the directional dependency of the contrast ratio of the liquid crystal layer to substantially maximize the contrast ratio of the liquid crystal layer to improve the contrast ratio of the display.

2. A visual image display as recited in claim 1 wherein:
   the liquid crystal layer has a back surface;
   the display is illuminated by a light source from the front surface of the faceplate; and
   the display further comprises a reflector, located adjacent to the back surface of the liquid crystal layer, serving to reflect light received from the liquid crystal layer back through the liquid crystal layer.

3. A visual image display as recited in claim 2, wherein:
   the display further comprises a first transparent electrode located in a position selected from the list of (a) between the first polarizer and the liquid crystal layer, and (b) between the faceplate and the first polarizer; and
   the reflector also serves as a second electrode.

4. A visual image display as recited in claim 2 further comprising:
   a first transparent electrode located in a position selected from the list of (a) between the first polarizer and the liquid crystal layer, and (b) between the faceplate and the first polarizer; and
   a second transparent electrode located between the liquid crystal layer and the reflector.

5. A visual image display as recited in claim 2 further comprising a second polarizer located between the liquid crystal layer and the reflector.

6. A visual image display as recited in claim 5, wherein:
   the display further comprises a first transparent electrode located in a position selected from the list of (a) between the first polarizer and the liquid crystal layer, and (b) between the faceplate and the first polarizer; and the reflector also serves as a second electrode.

7. A visual image display as recited in claim 5 further comprising:
   a first transparent electrode located in a position selected from the list of (a) between the first polarizer and the liquid crystal layer, and (b) between the faceplate and the first polarizer; and
   a second transparent electrode located in a position selected from the list of (a) between the liquid crystal layer and the second polarizer, and (b) between the second polarizer and the reflector.

8. A visual image display as recited in claim 1 wherein the thickness of the faceplate is within the range of 0.7 to 3 millimeters.

9. A visual image display as recited in claim 1 wherein:
   the display has a back surface where a light source illuminates the display; and
   the display further comprises a second polarizer located between the back surface of the display and the liquid crystal layer.

10. A visual image display as recited in claim 9 further comprising:
    a first transparent electrode located in a position selected from the list of (a) between the first polarizer and the liquid crystal layer, and (b) between the faceplate and the first polarizer; and
    a second transparent electrode located in a position selected from the list of (a) between the liquid crystal layer and the second polarizer, and (b) between the second polarizer and the back surface of the display.

11. A visual image display as recited in claim 9 wherein the thickness of the faceplate is within the range of 0.7 to 3 millimeters.

12. A method to improve the contrast ratio of a visual image display that has a liquid crystal layer, with a front surface and a contrast ratio that depends on the viewing direction from the front surface, the liquid crystal layer being adjacent to a first polarizer which is adjacent to an optical fiber faceplate, the faceplate having a plurality of substantially parallel optical fibers, each fiber having an axis which forms an oblique angle with the normal to the front surface of the liquid crystal layer, all the oblique angles being substantially equal to a typical oblique angle, the method comprising the steps of:
    determining the refractive index of the faceplate;
    measuring the directional dependency of the contrast ratio of the liquid crystal layer;
    identifying the direction with substantially the largest contrast ratio; and
    selecting the typical oblique angle to be substantially along the direction of the liquid crystal layer with the largest contrast ratio corrected by the refractive index, so as to improve the contrast ratio of the display.

* * * * *